April 22, 1924.
A. E. COOK ET AL
1,490,964
COMBINATION LAND AND WATER VEHICLE
Filed July 29, 1920     4 Sheets-Sheet 1
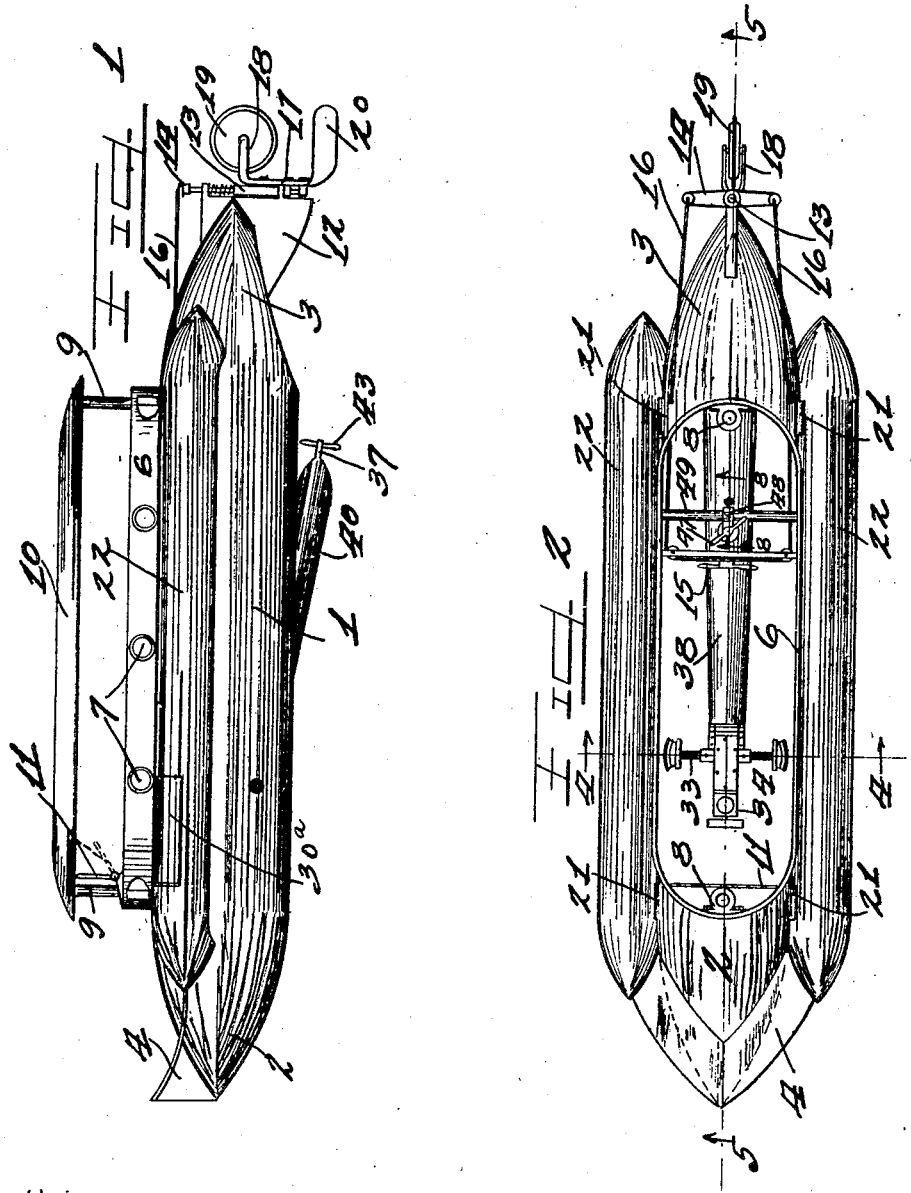

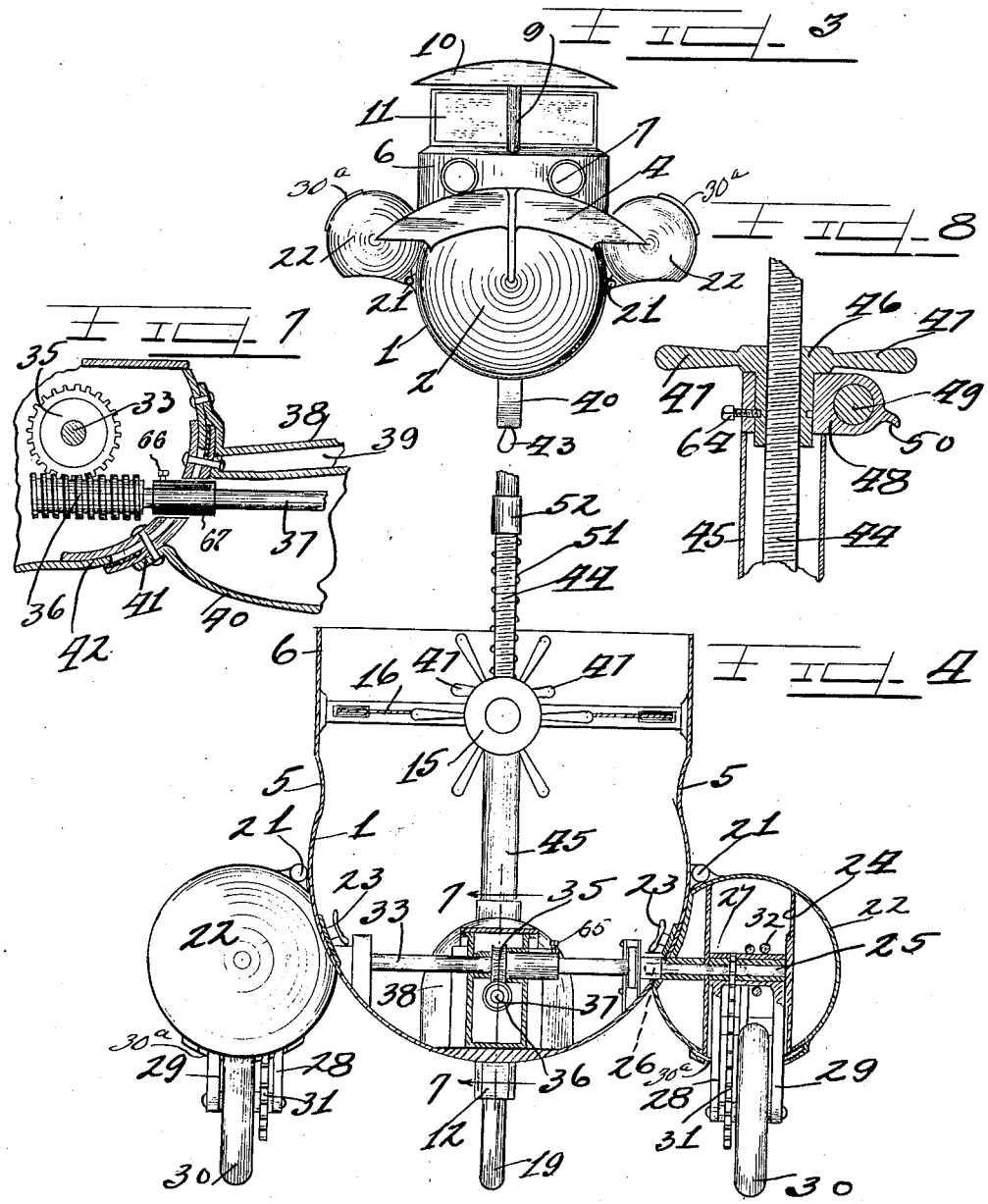

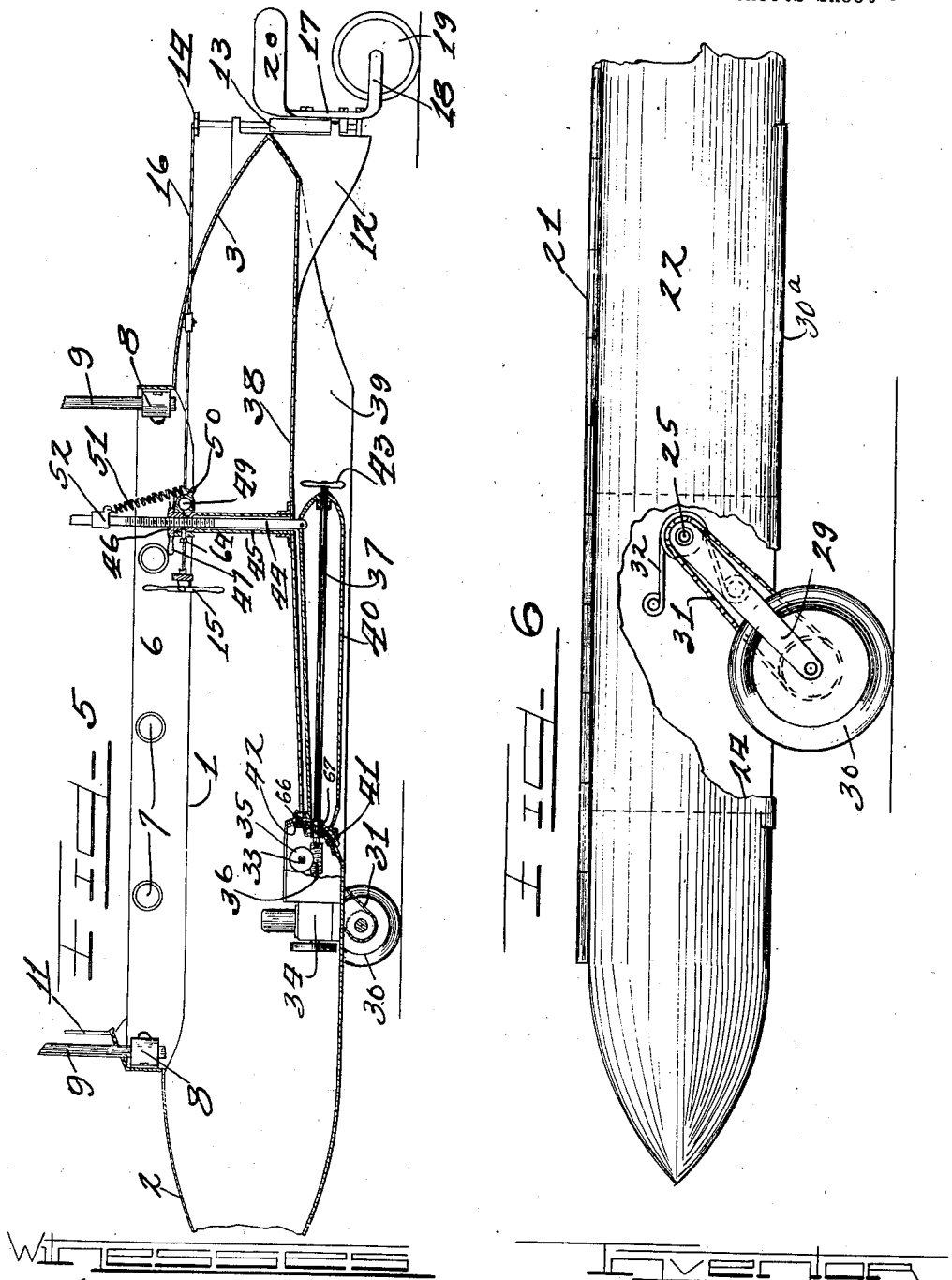

April 22, 1924.
A. E. COOK ET AL
1,490,964
COMBINATION LAND AND WATER VEHICLE
Filed July 29, 1920    4 Sheets-Sheet 4
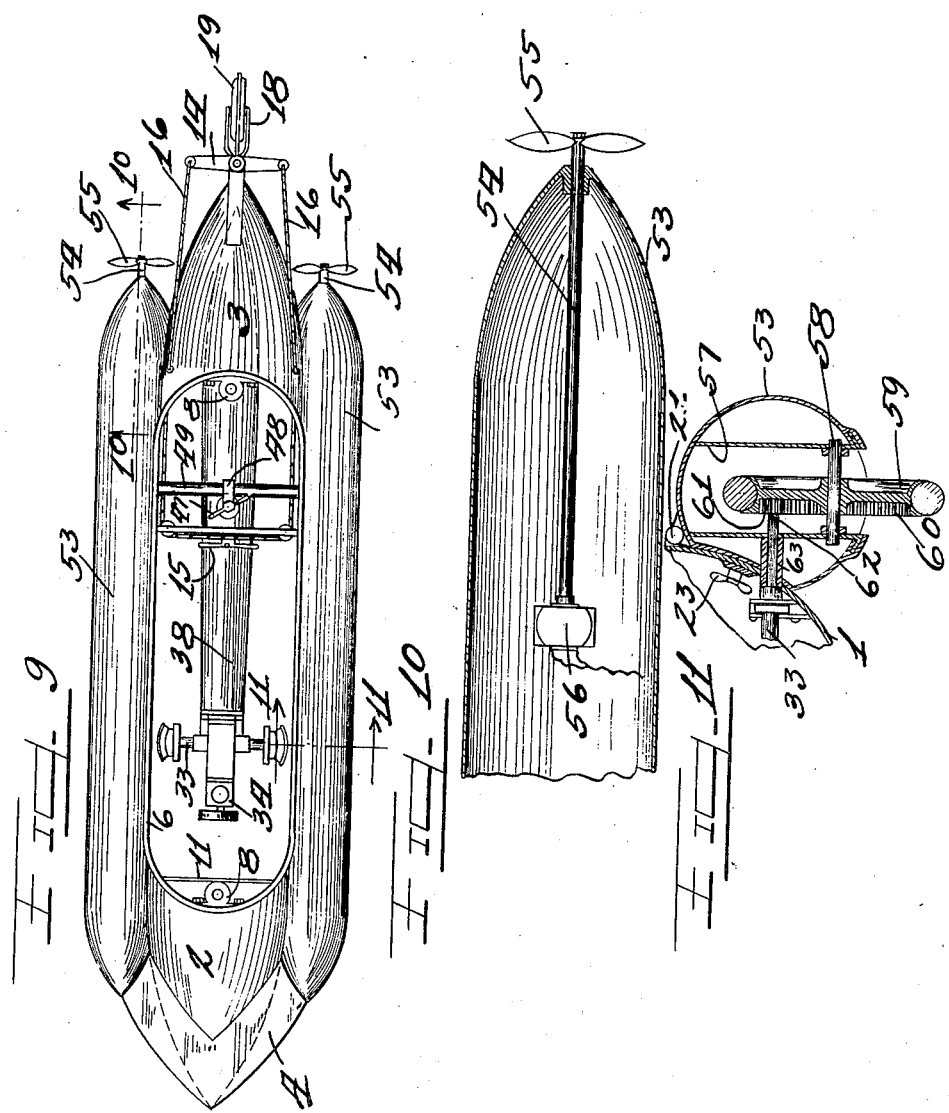

Patented Apr. 22, 1924.

1,490,964

UNITED STATES PATENT OFFICE.

ALBERT EUGENE COOK, OF EVANSTON, AND THOMAS VAN TUYL, OF KANKAKEE, ILLINOIS; SAID VAN TUYL ASSIGNOR TO SAID COOK.

COMBINATION LAND AND WATER VEHICLE.

Application filed July 29, 1920. Serial No. 399,821.

*To all whom it may concern:*

Be it known that we, ALBERT E. COOK and THOMAS VAN TUYL, citizens of the United States, and residents of the city of Evanston, in the county of Cook and State of Illinois, and the city of Kankakee, in the county of Kankakee and State of Illinois, respectively, have invented certain new and useful Improvements in Combination Land and Water Vehicles; and we do hereby declare that the following is a full, clear, and exact description of the same, reference being had to the accompanying drawings, and to the numerals of reference marked thereon, which form a part of this specification.

This invention relates to an improved type of vehicle adaptable for use on land or in water, and having a hull body provided with pontoons carrying driving wheels, said pontoons being adjustable to permit the draft of the vehicle when used in water to be changed to increase the stability of the vehicle in rough and stormy weather. The vehicle when in the water is propelled by a driving mechanism carried by a middle pontoon pivotally connected at one end to the vehicle hull to permit adjustment of said middle pontoon for further changing the draft of the vehicle.

It is an object of this invention to provide a land and water vehicle wherein draft varying pontoons are adjustably mounted on the sides of the vehicle body and are provided with driving wheel mechanisms for use when the vehicle is used on land.

It is also an object of this invention to provide a land and water vehicle wherein an adjustable pontoon is equipped with a propelling mechanism for driving the vehicle when used as a boat.

Another object of the invention is the construction of a combination land and water vehicle wherein an adjustable draft varying pontoon is provided with a propeller adapted to be driven from a power plant in the vehicle body.

A further object of the invention is the construction of a land and water vehicle wherein adjustable pontoons are provided with driving wheels and the rudder is equipped with a steering wheel so that the vehicle may be used on land as well as in the water.

It is furthermore an object of the invention to provide a variable draft vehicle wherein an adjustable steering mechanism is equipped with a wheel for use on land and with a rudder for use in water.

It is a further object of this invention to provide a variable draft vessel for travel as a deep draft craft in rough weather, and as a light draft craft of high speed in fair weather, and wherein adjustable pontoons are equipped with propelling devices for driving the vessel.

It is an important object of the invention to provide a vehicle with a reversible steering mechanism for use on land and in water, and with a propelling pontoon adapted to be adjusted for varying the draft of the vehicle in water and also capable of automatically swinging out of the way when striking an obstruction.

It is also an important object of this invention to provide a variable draft vessel wherein adjustable pontoons are mounted on the sides of the hull and an intermediate pontoon is adjustably connected at one end to the bottom of said hull and provided with a propelling mechanism for driving the vessel, and adaptable for use as a ballast chamber and also acts as a center board.

Other and further important objects of this invention will be apparent from the disclosures in the specification and drawings.

The invention (in a preferred form) is illustrated in the drawings and hereinafter more fully described.

On the drawings:

Figure 1 is a side elevation of a land and water vehicle embodying the principles of this invention.

Figure 2 is a top plan view thereof with the side pontoons in lowered position and with the roof removed.

Figure 3 is a front end view of the device showing the side pontoons in elevated position.

Figure 4 is an enlarged section taken on line 4—4, of Figure 2, showing parts in elevation.

Figure 5 is an enlarged section taken on line 5—5, of Figure 2, with parts in elevation.

Figure 6 is an enlarged side view of one of the side pontoons with parts broken away to show the mounting for the driving wheel.

Figure 7 is an enlarged fragmentary detail section taken on line 7—7, of Figure 4.

Figure 8 is an enlarged fragmentary detail section taken on line 8—8, of Figure 2.

Figure 9 is a top plan view of a modified form of land and water vehicle.

Figure 10 is an enlarged section taken on line 10—10, of Figure 9.

Figure 11 is an enlarged transverse section taken on line 11—11, of Figure 9.

As shown on the drawings:

The land and water vehicle of this invention comprises a long cylindrical hull 1, tapered or pointed at its forward and stern ends as denoted by the reference numerals 2 and 3, respectively. Rigidly mounted on the upper portion of the bow or forward end 2 of the hull, is a wave deflector 4, which is so shaped that the waves are deflected downwardly on opposite sides of the hull bow. The sides of the hull 1, near the upper portion thereof are curved inwardly to afford seats or pocket grooves 5. The hull is open at the top and is provided with an upright body wall 6, having port windows 7, mounted therein. Secured on the interior of the body wall 6, are sockets or brackets 8, for adjustably supporting the uprights or posts 9, of a shelter roof or top 10. The roof 10, may be raised or lowered, and when in lowered position is adapted to seat upon the upper rim of the body wall 6, to close the top of the vehicle hull.

Mounted transversely across the front end of the body portion 6, is a wind or spray shield 11, which is adjustably mounted to permit the same to be swung into the body portion 6, when the roof 10, is lowered.

Provided at the stern of the vehicle is a keel plate 12, on which is rotatably supported a rudder or steering stem 13, on the upper end of which is secured a cross bar 14. From the interior of the vehicle hull 1, the rudder stem 13 may be operated by a hand wheel 15, and suitable cables 16. The steering mechanism is adapted for use on land and in the water and embraces a reversible bracket or bar 17, one end of which has integrally formed thereon at right angles a bifurcated arm or fork 18, for supporting a steering wheel 19, for use as a steering means when the vehicle is used on land, as shown in Figure 5. The other end of the steering bracket 17 has integrally formed thereon a rudder 20, adapted to be used as a steering means when the vehicle is used as a vessel, as shown in Figure 1. The steering bracket 17, is adapted to be removably secured in vertical position on the steering stem 13, by bolts or other suitable means with either the rudder 20, or the steering wheel 19, in the lower position for use.

Adjustably connected longitudinally on opposite sides of the hull 1, by hinge connections 21, are long main or side pontoons 22, shown tapered or pointed at both ends, but not necessarily so constructed. The side pontoons 22, are adapted to be adjusted for changing the draft of the vehicle when used as a vessel. The side pontoons are adapted to be adjusted manually or by any other suitable means and when in their lowermost position as shown in Figure 4, are adapted to be secured in place by retaining screws or bolts 23.

Each side pontoon 22, is provided with a chamber 24, near the front end thereof, and journalled in suitable bearings in said chamber is an auxiliary shaft 25, one end of which is squared as at 26. A divided sleeve 27, is engaged around the axle bearing. Integrally formed on the divided sleeve 27, are parallel arms 28 and 29, the outer ends of which support a driving wheel 30. Secured on the hub of the wheel 30, is a sprocket gear or pinion around which a chain 31, is trained. The chain is also trained around a sprocket pinion secured on the auxiliary shaft 25 between the sleeve sections. A heavy spring 32, is coiled around the axle sleeve 27, and one end of said spring is secured to the arm 29, while the other end of the spring is fastened to one of the chamber walls of the pontoon. The spring 32 acts to hold the wheel in a projecting position and also serves to take up shocks when the vehicle is used on land. The wheel chambers 24, of the side pontoons are adapted to be closed by slidable doors 30ª, to retain the wheels 30, within the pontoon chambers 24, when the device is used in water.

In the lowered position of a pontoon 22, the squared end 26 of the auxiliary shaft 25, is adapted to engage in a squared recess provided in the end of a shaft 33, which is mounted transversely in the hull 1. The driving shaft 33, is driven by an engine 34, mounted in the hull 1. Secured on the driving shaft 33, is a worm gear 35, which is in mesh with a worm 36, provided on the engine shaft. A propeller shaft 37, is removably connected with the engine shaft by means of a set screw 66 and a connector 67. The hull 1, is provided at its bottom with a central longitudinal hood or housing 38, affording a chamber or pocket 39, in the bottom of said hull. Disposed within the hull pocket 39, is a middle or keel pontoon 40, the forward end of which is provided with a slidable water tight joint 41, which adjustably engages a curved slotted wall 42, of the hull 1, as disclosed in Figure 7. The propeller shaft 37, projects longitudinally through the middle or bottom pontoon 40, and has engaged on the rear projecting end thereof a propeller 43.

The middle or keel pontoon 40, is adapted to be adjustably swung downwardly out of the pocket 39, at an angle to the axis of the hull, as shown in Figure 1. Attached to the rear portion of the middle pontoon 40, is the lower end of a stem or rod 44, which projects upwardly through a vertical guide sleeve or pipe 45, mounted within the hull 1. The rod 44, is threaded, and has adjustably threaded thereon a cylindrical collar 46, provided with handles 47, for turning the same. The upper end of the sleeve 45, is secured to a bracket 48, which is rigidly supported on a transverse rod 49, the ends of which are supported by the side walls of the hull 1. Attached to a hook 50, of the bracket 48, is the lower end of a coiled spring 51, the upper end of which is connected to a collar 52, rigidly secured near the upper end of the adjusting rod 44. The spring 51, serves to normally hold the rotatable collar 46, seated in the bracket 48.

In the modified form of the device shown in Figures 9, 10 and 11, the construction is substantially the same as that already described. In this form of the land and water vehicle the hull is provided with adjustable side pontoons 53, each of which is provided with a propeller shaft 54, which has the rear end thereof projecting outwardly to receive a propeller 55. The inner end of each propeller shaft 54, is connected with a driving motor 56, or with any other suitable source of power.

Each side pontoon 53, near its forward end is provided with a chamber 57, having a wheel shaft 58, journalled therein. Supported on the shaft 58, is a wheel 59, provided with an internal gear 60, on the inner side thereof. Meshing with the internal gear 60, is a pinion 61, which is secured on one end of an auxiliary shaft 62, journalled in a bearing sleeve 63. The other end of the auxiliary shaft 62, is adapted to connect up with the main driving shaft 33, of the hull 1, when the side pontoon is in its lower position as shown in Figure 11.

The operation is as follows:

The vehicle or craft is adapted for operation over either land or water. In fair weather or on a quiet body of water, when it is desired to travel at a high rate of speed, or with light draft, the side pontoons 22, are swung downwardly into the position shown in Figure 4, and secured in place by the retaining screws 23. The middle pontoon 40, may also be swung downwardly into an inclined position by turning the collar 46, to cause the screw rod 44, to move downwardly through the sleeve 45. There is sufficient clearance between the rod 44 and the sleeve 45 to permit longitudinal movement of the rod 44 with respect to said sleeve 45. The middle pontoon 40, is adjustable about the joint 41, and the worm 36, is adapted to remain in mesh with the gear 35. The spring 51, serves to hold the collar 46, seated in the bracket 48. A set screw 64, is provided in the bracket 48, to engage in a groove of the collar 46, to hold the collar locked in an adjusted position.

With the pontoons 22 and 40, adjusted as described, the center of gravity is lowered, and a broad flotation surface is afforded, so that the craft has but a slight draft, but is still exceedingly stable. At high rates of speed, the craft may actually plane over the surface of the water owing to the slight draft.

In stormy weather or on a rough body of water, the stability of the craft is increased to reduce rolling and pitching of the craft. To increase the draft, the side pontoons 22, are swung into their upper positions as shown in Figure 3, as is also the middle pontoon 40. The center of buoyancy with respect to the axis of the draft is thus elevated, so that a greater draft displacement of the craft occurs. Owing to the fact that the center of gravity is now considerably below the water line of the craft, said craft is rendered exceedingly stable.

The craft when used in water is propelled by the propeller 43, carried by the adjustable middle pontoon 40. When the middle pontoon is lowered into an inclined position and the set screw 64, is removed from engagement with the collar 46, the middle pontoon is adapted to automatically swing upwardly into the pocket 39, when the craft is in motion and when an obstruction is encountered by said middle pontoon. Damage to the middle pontoon is thus obviated. The spring 51, acts to return the pontoon 40, into its inclined position after the obstruction is passed.

When the device is used as a water craft the steering bracket 17, is secured to the steering stem 13, with the rudder 20, below the wheel 19, as shown in Figure 1. The craft may be readily steered from the interior of the hull 1, by operating the hand wheel 15.

The device is adaptable for use as a land vehicle and, as shown in Figure 5, the middle pontoon 40, is retracted into normal horizontal position within the hull bottom pocket 39. The side pontoons are secured in their lower position to the sides of the hull 1, thus permitting the front portion of the vehicle to rest on the driving wheels 30. The steering bracket is also reversed so that the steering wheel 19, is below the rudder and is adapted to run on the ground and support the rear end of the vehicle. When the device is used as a land vehicle the drive from the engine 34, is transmitted by the shafts 33 and 25, and the chains 31, to the front wheels 30. The connection between the propellor shaft 37, and the engine 34, may be disconnected by loosening the set screw 65 which holds the worm gear 35 secured to the driving shaft 33, the worm gear 35 is permitted to idle in the shaft 33.

When it is desired to disconnect the propeller shaft 37 from the engine 34 and still maintain a driving relation between the engine 34 and the shaft 33, the set screw 65 is left in its set locking position and the set screw 66 (Fig. 7) is loosened, thereby disconnecting the connector 67 from the worm member 36.

In the modified form of the device disclosed in Figures 9, 10 and 11, the operation is substantially the same as that already described. In this case, however, the side pontoons are equipped with propeller mechanisms for driving the craft when in the water. As shown in Figure 11, the driving wheels 59, are adapted to be driven through the pinions 61 and the internal gears 60, when the modified form of the device is used as a land vehicle.

We are aware that numerous details of construction may be varied through a wide range without departing from the principles of this invention, and we therefore do not purpose limiting the patent granted otherwise than necessitated by the prior art.

We claim as our invention:

1. In a land and water vehicle the combination with a hull, and invertible means thereon for steering the vehicle on land and in the water.

2. The combination with a land and water vehicle, of a hull, adjustable side pontoons connected therewith, and a middle pontoon adjustably connected with the bottom of said hull.

3. A land and water vehicle comprising a hull, steering means thereon, and side and bottom pontoons adjustably connected with said hull for varying the draft of the vehicle when used in water.

4. A land and water vehicle comprising a hull, pontoons adjustably mounted thereon, and driving mechanisms carried by said pontoons and supporting the vehicle when the vehicle is used on land.

5. A land and water vehicle comprising a hull, a pontoon adjustably connected at one end to said hull for varying the draft of said hull, and driving means carried by said pontoon for propelling the vehicle when in water.

6. A land and water vehicle embracing a hull, side pontoons adjustably connected therewith for varying the draft of the vehicle when in water, driving means supported by said side pontoons for supporting and driving the vehicle when on land, driving mechanisms within said hull connected to impart a drive to said driving means, a lower pontoon adjustably connected to said hull, and propeller means carried by the lower pontoon and connected with said driving mechanism for propelling the vehicle when in the water.

7. A land and water vehicle embracing a hull, driving mechanisms therein, a pontoon adjustably connected at one end to the bottom of said hull, an adjusting mechanism in said hull connected with the other end of said pontoon to adjust the same to vary the draft of the vehicle when in water, a propeller carried by said pontoon for propelling the vehicle in the water, and means supporting said propeller and connecting the same with the driving mechanisms in said hull.

8. The combination with a craft hull, of a keel pontoon adjustably connected therewith to vary the draft thereof and adapted to move out of the way to avert damage when an obstacle is encountered.

9. The combination with a craft hull having a pocket formed longitudinally in the bottom thereof, a power mechanism in said hull, a pontoon, means at one end thereof for adjustably connecting said pontoon to said hull to permit the pontoon to normally seat in said hull pocket, a propeller mechanism carried by said pontoon and connected with said power mechanism to be driven thereby, and means within said hull and connected with the other end of said pontoon for adjusting said pontoon at an angle with respect to said hull for varying the draft of the hull.

10. A land and water vehicle comprising a body, power driving means mounted therein, a keel pontoon pivotally connected at one end to said body and adapted to be lowered into an inclined position relative to said body to change the draft of the body, and propelling means carried by said keel member and connected with said power driving means.

11. In a land and water vehicle the combination with a hull, of a keel pontoon adjustably connected therewith for driving the vehicle and changing the draft thereof.

12. In a land and water craft, a body, means for steering the craft on land and on water, side pontoons adjustably connected to said body, means carried by said side pontoons for driving the craft on land, a middle pontoon adjustably connected to the bottom of said body, and means carried by said middle pontoon for driving the craft upon the water, said side and middle pontoons adapted to be adjusted to change the draft and stabilize the craft when used on the water.

13. A land and water craft comprising a body, means for steering the same on land and water, a power mechanism in said body, side pontoons adjustably connected to said body to vary the draft thereof when on the water, wheel mechanisms carried by said side pontoons and connected with said power mechanism for driving the craft on land, a bottom pontoon adjustably connected to said body, means in said body connected with said bottom pontoon to adjust the same to assist in varying the draft of said body, and propeller means supported by said bottom pontoon and connected with said power mechanism for driving the craft when in the water.

14. In a land and water craft the combination with a hull, of a steering mechanism thereon, a steering wheel forming a part thereof for use in steering the craft on land, a rudder also forming a part of said steering mechanism adapted for steering the craft in water, side pontoons adjustably connected with said hull, wheel mechanisms supported by said side pontoons for supporting and driving the craft on land, a bottom pontoon adjustably connected with said hull, means for adjusting the bottom pontoon, and driving means carried by said bottom pontoon for propelling the craft when used on water.

15. In a land and water craft a hull, a pontoon adjustably connected thereto, a guide sleeve in said hull, a threaded rod slidable therein and connected to said pontoon, rotable means on said rod for raising and lowering the same to adjust said pontoon to vary the draft of the craft when in the water, and means connected with said hull for holding said rotable means seated on the upper end of said guide sleeve thereby retaining said pontoon in its adjusted position.

16. In a land and water craft a hull, a pontoon adjustably connected thereto, propeller means carried by said pontoon to propel the craft when in the water, a sleeve in said hull, a rod projecting therethrough and connected to said pontoon, means on said rod for adjusting the same to change the position of said pontoon with respect to the hull for varying the draft of the craft, and resilient means connected with said rod for removably holding said pontoon in its adjusted position, said pontoon adapted to move out of the way when said pontoon strikes an obstruction.

In testimony whereof, we have hereunto subscribed our names in the presence of two subscribing witnesses.

ALBERT EUGENE COOK.
THOMAS VAN TUYL.

Witnesses:
EARL M. HARDINE,
CARLTON HILL.